(12) United States Patent
Wang

(10) Patent No.: US 11,977,291 B1
(45) Date of Patent: May 7, 2024

(54) DISPLAY PANEL AND DISPLAY DEVICE

(71) Applicant: GUANGZHOU CHINA STAR OPTOELECTRONICS SEMICONDUCTOR DISPLAY TECHNOLOGY CO., LTD., Guangzhou (CN)

(72) Inventor: Yanan Wang, Guangzhou (CN)

( * ) Notice: Subject to any disclaimer, the term of this patent is extended or adjusted under 35 U.S.C. 154(b) by 0 days.

(21) Appl. No.: 17/988,813

(22) Filed: Nov. 17, 2022

(30) Foreign Application Priority Data

Oct. 18, 2022 (CN) .......................... 202211269924.2

(51) Int. Cl.
*G02F 1/1335* (2006.01)
*G02F 1/1333* (2006.01)
*G02F 1/1339* (2006.01)
*G02F 1/1343* (2006.01)

(52) U.S. Cl.
CPC .. *G02F 1/133512* (2013.01); *G02F 1/133308* (2013.01); *G02F 1/133345* (2013.01); *G02F 1/1339* (2013.01); *G02F 1/134309* (2013.01); *G02F 2201/50* (2013.01); *G02F 2202/16* (2013.01); *G02F 2202/28* (2013.01)

(58) Field of Classification Search
CPC .... G02F 1/0107; G02F 1/1339; G02F 1/1341; G02F 1/161; G02F 1/133707; G02F 1/13392; G02F 1/13394; G02F 1/133377; G02F 1/13396; G02F 1/13398; G02F 2001/13396; G02F 2001/13398; H01L 27/3246
See application file for complete search history.

(56) References Cited

U.S. PATENT DOCUMENTS

| | | | |
|---|---|---|---|
| 6,466,294 B1* | 10/2002 | Yamagishi | G02F 1/1345 430/7 |
| 2002/0131003 A1* | 9/2002 | Matsumoto | G02F 1/1345 349/139 |
| 2018/0081109 A1* | 3/2018 | Xu | G02B 6/0088 |

(Continued)

FOREIGN PATENT DOCUMENTS

| | | | | |
|---|---|---|---|---|
| CN | 102830564 A | * | 12/2012 | |
| CN | 102830564 A | | 12/2012 | |
| CN | 104391389 A | * | 3/2015 | ........... G02F 1/1339 |

(Continued)

OTHER PUBLICATIONS

Chinese Office Action issued in corresponding Chinese Patent Application No. 202211269924.2 dated Nov. 24, 2022, pp. 1-9.

*Primary Examiner* — Shan Liu

(57) ABSTRACT

A display panel and a display device are provided. The display panel includes a first substrate, a second substrate, and a sealant layer. The first substrate includes a ground electrode positioned in a frame region. The second substrate includes a black matrix layer and a protective layer. The protective layer is positioned on a side surface of the black matrix layer close to the first substrate. In the present application, at least one opening is arranged on the protective layer positioned in the frame region, so that the black matrix layer is exposed. By arranging the conductive adhesive in the sealant layer or forming the sealant layer with the conductive adhesive, the black matrix layer can be electrically connected to the ground electrode of the first substrate through the conductive adhesive.

15 Claims, 5 Drawing Sheets

(56) References Cited

U.S. PATENT DOCUMENTS

2018/0299724 A1    10/2018  Gu et al.

FOREIGN PATENT DOCUMENTS

| | | | | |
|---|---|---|---|---|
| CN | 105068306 A | * | 11/2015 | ....... G02F 1/133512 |
| CN | 108873461 A | | 11/2018 | |
| CN | 113219701 A | | 8/2021 | |
| CN | 114355664 A | * | 4/2022 | |
| CN | 114415429 A | | 4/2022 | |
| CN | 216434612 U | | 5/2022 | |
| JP | 3015703 B2 | * | 3/2000 | |
| JP | 2011002608 A | | 1/2011 | |

* cited by examiner

DISPLAY PANEL AND DISPLAY DEVICE

FIELD OF INVENTION

The present application relates to a field of display technology, and in particular, to a display panel and a display device.

BACKGROUND OF INVENTION

Liquid crystal displays have different display modes. Currently, a horizontal alignment mode, a vertical alignment, and a twisted nematic mode are mainstream in the industry. The horizontal alignment mode is the most widely used, but due to the characteristics of its design, the horizontal mode has some problems, such as a light leakage problem which often occurred in a reliability deterioration test.

Specifically, as shown in FIG. 1, which is a schematic diagram of a basic structure of a display panel in the prior art. The display panel includes a display region A1 and a frame region A2 arranged around the display region A1. The display panel includes a first substrate 10, a second substrate 20, a sealant layer 30, and a liquid crystal molecule layer 40. The second substrate 20 includes a black matrix layer 201 and a color resist layer 204 arranged in the black matrix layer 201. A reason for the light leakage problem is that the charge carried by the water vapor in the environment causes charge accumulation in the black matrix layer 201 of the frame region A2. Because the black matrix layer 201 contains carbon black as a main light absorbing material, its resistance value is relatively low, and the accumulated charges will migrate into the display region A1 of the display panel, which in turn leads to an abnormal display of display region A1, manifesting as light leakage. Since the black matrix layer 201 in the frame region A2 is mainly used to block light leakage from the circuit, so the methods such as shrinking the black matrix layer 201 or grooving the black matrix layer 201 will cause light leakage in the frame region A2 to different degrees, which affects the display quality. Therefore, it is necessary to improve this defect.

SUMMARY OF INVENTION

Embodiments of the present application provide a display panel for solving the technical problem that the black matrix layer of the display panel in the prior art has conductivity, and the charges accumulated on the black matrix layer in the frame region migrate to the display region, causing light leakage in the display region.

One embodiment of the present application provides a display panel, including a display region and a frame region arranged around the display region, wherein the display panel includes: a first substrate including a ground electrode positioned in the frame region; a second substrate including a black matrix layer and a protective layer, wherein the protective layer is positioned on a side surface of the black matrix layer close to the first substrate, and wherein the protective layer includes at least one opening in the frame region; and a sealant layer positioned between the first substrate and the second substrate; wherein the sealant layer is provided with a conductive adhesive or the sealant layer is formed by the conductive adhesive, wherein the conductive adhesive is disposed opposite to a region of the opening, and wherein the black matrix layer is electrically connected to the ground electrode through the conductive adhesive.

In the display panel provided by one embodiment of the present application, the protective layer includes a plurality of the openings, wherein the conductive adhesive is disposed in the sealant layer, wherein the conductive adhesive is disposed opposite to the region of the openings, wherein the frame region includes a first frame region and a second frame region that are adjacently arranged, and wherein on a plane perpendicular to a light-emitting side of the display panel, an area of the first frame region is larger than an area of the second frame region, and wherein a number of the openings in the first frame region is greater than a number of the openings in the second frame region.

In the display panel provided by one embodiment of the present application, the frame region includes a plurality of conductive regions and a plurality of insulating regions, wherein the plurality of the openings are arranged in a one-to-one correspondence with the plurality of the conductive regions, and wherein the insulating region is positioned between two adjacent conductive regions; wherein in the direction perpendicular to the light-emitting side of the display panel, a width of the sealant layer in the conductive region is greater than a width of the sealant layer in the insulating region.

In the display panel provided by one embodiment of the present application, in the direction perpendicular to the light-emitting side of the display panel, the width of the sealant layer in the insulating region is 1.5 times greater than a width of the opening, and the width of the sealant layer in the conductive region is larger than the width of the opening.

In the display panel provided by one embodiment of the present application, the protective layer includes one of the openings, and in a direction perpendicular to the light-emitting side of the display panel, a cross-sectional shape of the opening is a zigzag shape; wherein the sealant layer is provided with the conductive adhesive or the sealant layer is formed by the conductive adhesive, and wherein the conductive adhesive is disposed opposite to the region of the opening.

In the display panel provided by one embodiment of the present application, in the direction perpendicular to the light-emitting side of the display panel, a width of the sealant layer is greater than a width of the opening.

In the display panel provided by one embodiment of the present application, the first substrate includes a connection electrode positioned in the frame region, wherein the connection electrode is positioned on a side of the ground electrode close to the second substrate, and wherein the conductive adhesive is electrically connected to the ground electrode through the connection electrode.

In the display panel provided by one embodiment of the present application, the first substrate includes a common electrode layer, a first insulating layer, and a pixel electrode layer, wherein the first insulating layer is positioned at a side of the common electrode layer close to the second substrate, and wherein the pixel electrode layer and the connection electrode are positioned on a side surface of the first insulating layer close to the second substrate; or wherein the first substrate includes the first insulating layer, a plurality of common electrodes, and a plurality of pixel electrodes, wherein the common electrodes are insulated from the pixel electrodes, and wherein the connection electrode, the plurality of common electrodes, and the plurality of pixel electrodes are positioned on the side surface of the first insulating layer close to the second substrate.

In the display panel provided by one embodiment of the present application, the conductive adhesive includes a colloid and a plurality of conductive particles doped in the colloid, wherein a ratio of a diameter of the conductive particle to a vertical distance from the first substrate to the second substrate is greater than or equal to 1.1 and less than or equal to 1.4.

One embodiment of the present application further provides a display device including a backlight module and the above-mentioned display panel, wherein the display panel is positioned on a light-emitting side of the backlight module.

Beneficial effects: a display panel provided by one embodiment of the present application includes a display region and a frame region arranged around the display region. The display panel includes a first substrate, a second substrate, and a sealant layer. The first substrate includes a ground electrode. The second substrate includes a black matrix layer and a protective layer. The protective layer is positioned on a side surface of the black matrix layer close to the first substrate. The protective layer includes at least one opening in the frame region. The sealant layer is positioned between the first substrate and the second substrate. The sealant layer is provided with a conductive adhesive or the sealant layer is formed of conductive adhesive. The conductive adhesive is disposed opposite to a region of the opening. The black matrix layer is electrically connected to the ground electrode through the conductive adhesive. In the present application, at least one opening is arranged on the protective layer positioned in the frame region, so that the black matrix layer is exposed. By arranging the conductive adhesive in the sealant layer or forming the sealant layer with the conductive adhesive, the black matrix layer can be electrically connected to the ground electrode of the first substrate through the conductive adhesive. The charges accumulated on the black matrix layer can be released to the ground electrode of the first substrate through the conductive adhesive. The excess charges are extracted through external lines, so as to avoid an increasement of the electric charge, which affects an in-plane display. Thereby improving a problem of light leakage in the display region caused by a conductivity of the black matrix layer in a horizontal alignment mode.

DESCRIPTION OF FIGURES

In order to illustrate the technical solutions in the embodiments of the present application more clearly, the following briefly introduces the accompanying figures that need to be used in the description of the embodiments.

DETAILED DESCRIPTION OF EMBODIMENTS

The technical solutions in the embodiments of the present application will be clearly and completely described below with reference to the accompanying figures in the embodiments of the present application. In the figures, for clarity and ease of understanding and description, the dimensions and thicknesses of components depicted in the figures are not to scale.

Figure 1:
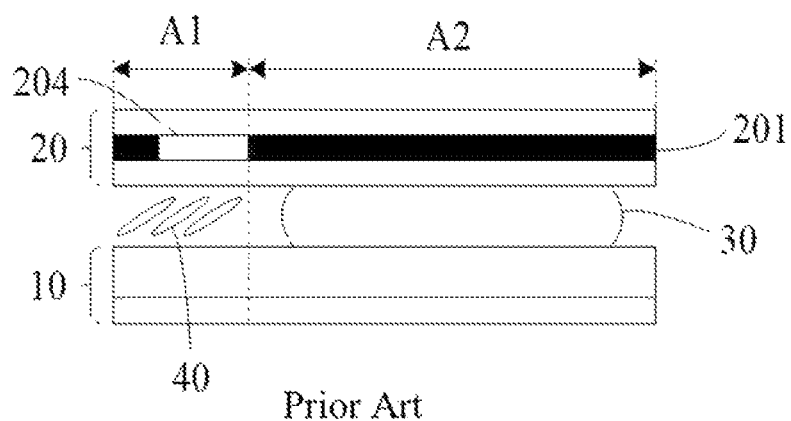
FIG. 1 is a schematic diagram of a basic structure of a display panel in the prior art.
Figure 2:
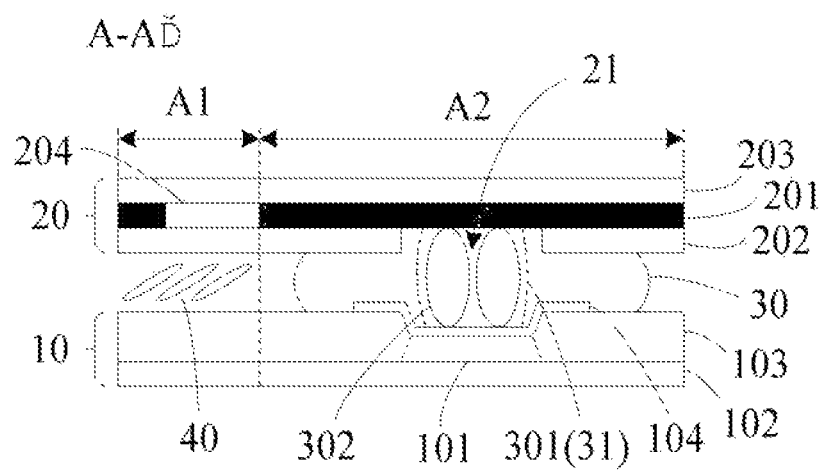
FIG. 2 is a schematic diagram of a basic structure of a display panel provided by one embodiment of the present application.
Figure 3:
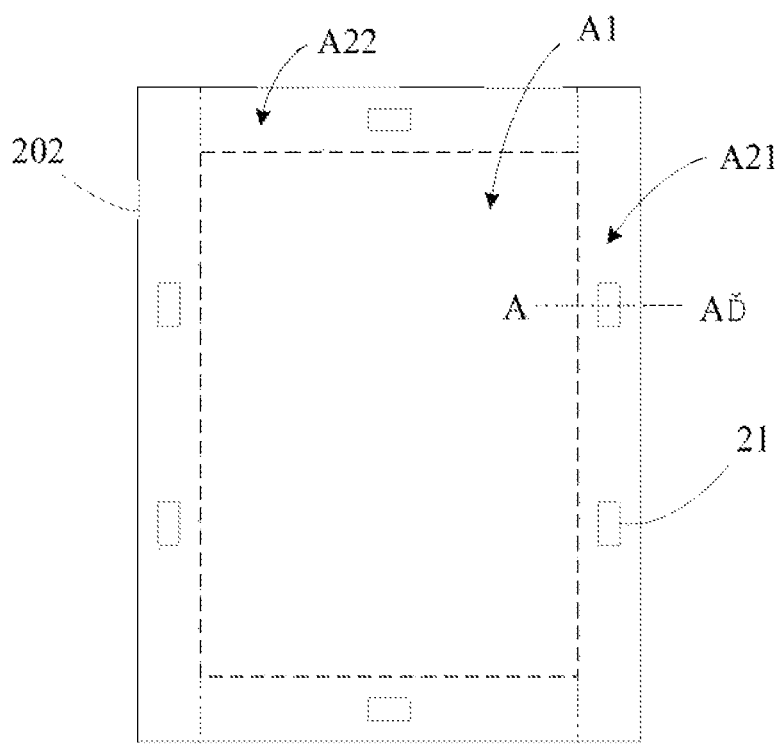
FIG. 3 is a schematic diagram of a basic structure of a protective layer provided by one embodiment of the present application.

As shown in FIG. 2 and FIG. 3, FIG. 2 is a schematic diagram of a basic structure of a display panel according to one embodiment of the present application and FIG. 3 is a schematic diagram of a basic structure of a protective layer according to one embodiment of the present application. Specifically, FIG. 2 is a cross-section of the display panel along a direction AA' shown in FIG. 3. The display panel includes a display region A1 and a frame region A2 arranged around the display region A1. The display panel includes a first substrate 10, a second substrate 20, and a sealant layer 30. The first substrate 10 includes a ground electrode 101 positioned in the frame region A2. The second substrate 20 includes a black matrix layer 201 and a protective layer 202. The protective layer 202 is positioned on a side surface of the black matrix layer 201 close to the first substrate 10. The protective layer 202 includes at least one opening 21 in the frame region A2. The sealant layer 30 is positioned between the first substrate 10 and the second substrate 20. The sealant layer 30 is provided with a conductive adhesive 31 or the sealant layer 30 is formed by the conductive adhesive 31, wherein the conductive adhesive 31 is disposed opposite to a region of the opening 21. The black matrix layer 201 is electrically connected to the ground electrode 101 through the conductive adhesive 31.

It should be noted that, since the black matrix layer 201 needs to have a certain degree of shading, carbon black (not shown in the figure) generally needs to be added to the black matrix layer 201, and carbon black makes the black matrix layer 201 easy to conduct electricity. The charged charges will cause the black matrix layer 201 of the frame region A2 to generate charge accumulation, and the accumulated charges will migrate into the display region A1 of the display panel, resulting in abnormal display in the display region A1, which is manifested as light leakage. If an insulating material is used to form the black matrix layer 201, a shading degree of the black matrix layer 201 will be insufficient, resulting in poor display effect.

It can be understood that in the present application, the black matrix layer 201 is exposed by disposing at least one opening 21 on the protective layer 202 in the frame region A2, and the black matrix layer 201 can be electrically connected to the ground electrode 101 of the first substrate 10 through the conductive adhesive 31 by disposing the conductive adhesive 31 in the sealant layer 30 or forming the sealant layer 30 with the conductive adhesive 31. The charge accumulated on the black matrix layer 201 can be released to the ground electrode 101 of the first substrate 10 through the conductive adhesive 31, and the excess charge can be released through the external circuit, so as to avoid an increasement of the charge and affect the in-plane display, and improve a problem of light leakage in the display area A1 caused by the conductivity of the black matrix layer 201 in the horizontal alignment mode. In addition, the present application does not need to adjust a structure of the black matrix layer 201, and will not cause light leakage in the frame region A2, which will affect the display quality.

It should be noted that the ground electrode 101 refers to any setting electrode that is electrically connected to a ground potential. The ground electrode 101 can be connected to a ground signal line on the display panel, or can be connected to an external input signal independently.

It should be noted that, a first forming process of the sealant layer 30 is as follows: first, a layer of sealant is applied in the frame region A2 of the first substrate and then a conductive adhesive 31 is applied on a region of the sealant opposite to the opening 21. The conductive adhesive 31 is pressed into the sealant and cured when the first substrate 10 and the second substrate 20 are paired, thereby forming the sealant layer 30. That is, in the first embodiment of the present application, the conductive particles 302 are not directly added to the sealant, but the conductive adhesive 31 is additionally coated on the sealant in the region opposite to the opening 21. Therefore, only the region of the opening 21 has conductive particles 302, thereby saving costs. In addition, the conductive adhesive 31 can also be coated by a sealant coating machine without other special operations, and the curing is also the same as that of the sealant, no additional process adjustment is required, which causes the implementation is relatively simple.

It should be noted that the second forming process of the sealant layer 30 is as follows: directly coating the conductive adhesive 31 in the frame region A2 of the first substrate 10 and then curing, that is, the second embodiment of the present application is to make the sealant layer 30 formed of the conductive adhesive 31.

In one embodiment, as shown in FIG. 3, the protective layer 202 includes a plurality of the openings 21. The conductive adhesive 31 is disposed in the sealant layer 30. The conductive adhesive 31 is disposed opposite to the region of the openings 21. The frame region A2 includes a first frame region A21 and a second frame region A22 that are adjacently arranged. On a plane perpendicular to the light-emitting side of the display panel, an area of the first frame region A21 is larger than an area of the second frame region A22. A number of the openings 21 in the first frame region A21 is greater than a number of the openings 21 in the second frame region A22.

It should be noted that the first frame region A21 corresponds to a long side of the display panel, and the second frame region A22 corresponds to a short side of the display panel. Since an area of the long side is larger than an area of the short side, a number of openings 21 on the long side can be set greater than a number of openings 21 on the short side to balance an ability of an entire frame region A2 to transfer charges. Specifically, in FIG. 3, only two openings 21 on the long side and one opening 21 on the short side are used for illustration. Display panels of different sizes can adjust the number of openings according to actual needs, wherein the number of openings 21 on the long side needs to meet greater than or equal to 2, the number of the openings 21 on the short side need to meet greater than or equal to 1.

It should be noted that, a formation process of the opening 21 may be laser, exposure, or dry etching process, preferably laser. The laser energy is adjusted according to a thickness and a material of the protective layer 202 designed for the actual product.

Continuing to refer to FIG. 2, in one embodiment, the first substrate 10 includes a connection electrode 104 positioned in the frame region A2. The connection electrode 104 is positioned on a side of the ground electrode 101 close to the second substrate 20. The conductive adhesive 31 is electrically connected to the ground electrode 101 through the connection electrode 104.

It can be understood that, in this embodiment, a flexibility of the arrangement of the ground electrode 101 can be improved by making the conductive adhesive 31 contact the connection electrode 104 to make the connection electrode 104 contact the ground electrode 101. That is, the ground electrode 101 does not need to be arranged on a side surface of the first substrate 10 close to the second substrate 20. The ground electrode 101 can be provided on any layer of the connection electrode 104 on the side away from the second substrate 20. Subsequently, before the connection electrode 104 is manufactured, the first insulating layer 103 positioned on the ground electrode 101 is etched to form a corresponding through hole. Finally, the connection electrode 104 covers the through hole when the connection electrode 104 is manufactured, thereby increasing a stability of the through hole and a conductivity between the connection electrode 104 and the ground electrode 101.

In one embodiment, the first substrate 10 further includes a first base substrate 102. The ground electrode 101 is positioned on a side of the first base substrate 102 close to the second substrate 20. The side of the first base substrate 102 close to the second substrate 20 is also provided with a driving circuit layer (not shown). The driving circuit layer includes a plurality of thin film transistors, and the ground electrode 101 can be manufactured in a same process as any metal layer in the thin film transistors. Therefore, no additional process flow is required. Since the driving circuit layer is not a focus of the present application, it will not be described in detail.

In one embodiment, the second substrate 20 further includes a second base substrate 203 and a color resist layer 204. The black matrix layer 201 is positioned on a side of the second base substrate 203 close to the first substrate 10. The black matrix layer 201 includes a light-transmitting region, and the color resist layer 204 is positioned in the light-transmitting region of the black matrix layer 201. The display panel further includes a liquid crystal molecule layer 40 positioned between the first substrate 10 and the second substrate 20.

In one embodiment, the conductive adhesive 31 includes a colloid 301 and a plurality of conductive particles 302 doped in the colloid 301. A ratio of a diameter of the conductive particle 302 to a vertical distance from the first substrate 10 to the second substrate 20 is greater than or equal to 1.1 and less than or equal to 1.4.

It can be understood that the conductive adhesive 31 in this embodiment is formed by mixing the colloid 301 with the conductive particles 302 of a corresponding particle size. The conductive particles 302 are, for example, gold balls. In this embodiment, a ratio of a diameter of the conductive particle 302 to the vertical distance from the first substrate 10 to the second substrate 20 is set to be greater than or equal to 1.1 and less than or equal to 1.4. That is, the diameter of the conductive particle 302 is slightly greater than the vertical distance from the first substrate 10 to the second substrate 20, so that after the first substrate 10 and the second substrate 20 are paired together, the black matrix layer 201 and the connection electrode 104 can be electrically connected.

In one embodiment, a ratio of a mass of the conductive particle 302 to a mass of the colloid 301 is greater than or equal to 0.01 and less than or equal to 0.04. For example, the ratio of the mass of the conductive particle 302 to the mass of the colloid 301 is 0.02.

Figure 4:
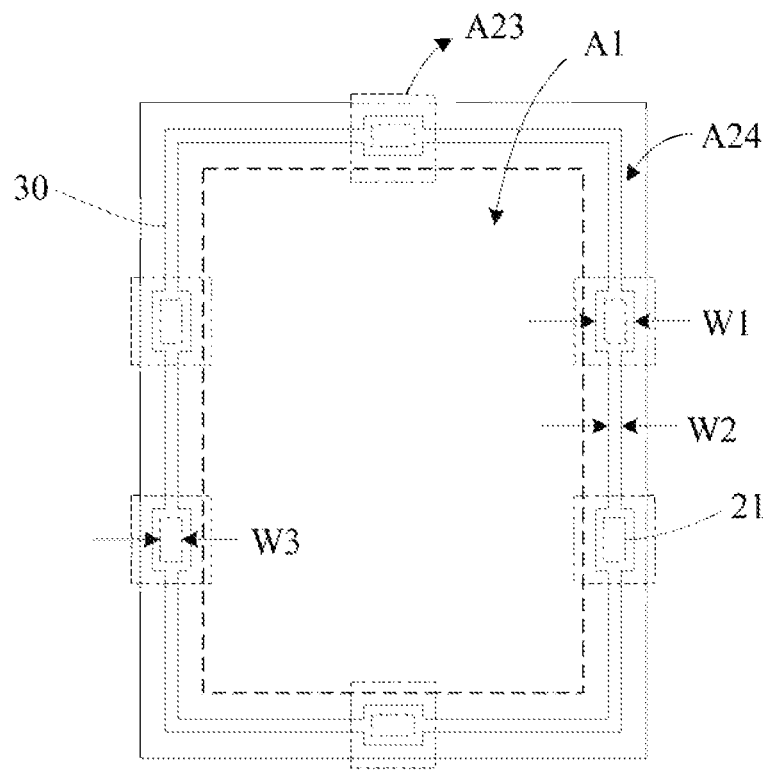
FIG. 4 is a first structural schematic diagram of a sealant layer provided by one embodiment of the present application.

It can be understood that since the conductive adhesive 31 is only coated on the region of the opening 21, after the first substrate 10 and the second substrate are pressed together, only the sealant layer 30 in the region of the opening 21 has the conductive adhesive 31. That is, the sealant layer 30 in the region of the opening 21 is wider than the sealant layer 30 in the region other than the opening 21. Specifically, as shown in FIG. 4, which is a schematic diagram of a first structure of the sealant layer provided by one embodiment of the present application. In this embodiment, the frame region A2 includes a plurality of conductive regions A23 and a plurality of insulating regions A24. A plurality of the openings 21 are arranged in a one-to-one correspondence with the plurality of the conductive regions A23. The insulating region A24 is positioned between two adjacent conductive regions A23. In a direction perpendicular to the light-emitting side of the display panel, a width W1 of the sealant layer 30 in the conductive region A23 is greater than a width W2 of the sealant layer 30 in the insulating region A24.

It can be understood that, in this embodiment, the protective layer 202 is provided with a plurality of openings 21, each opening 21 corresponds to a conductive region A23. The conductive region A23 is coated with the conductive adhesive 31 correspondingly, and the insulation region A24 between the conductive regions A23 is not coated with the conductive adhesive 31. Therefore, after lamination, the sealant layer 30 in the conductive region A23 will become wider, and the width W2 of the sealant layer 30 in the insulating region A24 will remain unchanged. In FIG. 4, a cross-sectional shape of the opening 21 is only a rectangle as an example for illustration. In other embodiments, the shape of the opening 21 may also be a circle or other polygons.

It should be noted that a width W3 of the opening 21 can be set to be equal to the width W2 of the sealant layer 30 in the insulating region A24, or it can be set to be slightly larger than the width W2 of the sealant layer 30 in the insulating region A24, this is because the conductive adhesive 31 should be provided in the region of the opening 21, after the conductive adhesive 31 and the sealant are pressed together, the width of the sealant layer 30 will increase (W1>W2), so that an entire region of the opening 21 can be filled. Specifically, in one embodiment, in the direction perpendicular to the light-emitting side of the display panel, the width W2 of the sealant layer 30 in the insulating region A24 is 1.5 times greater than the width W3 of the opening 21, and the width W1 of the sealant layer 30 in the conductive region A23 is greater than the width W3 of the opening 21. That is, the width of the opening 21 needs to be less than 1.5 times the width of the sealant layer 30 in the insulating region A24 to prevent the conductive adhesive 31 and the sealant from being unable to fill the entire region of the opening 21 after being pressed together.

Figure 5:
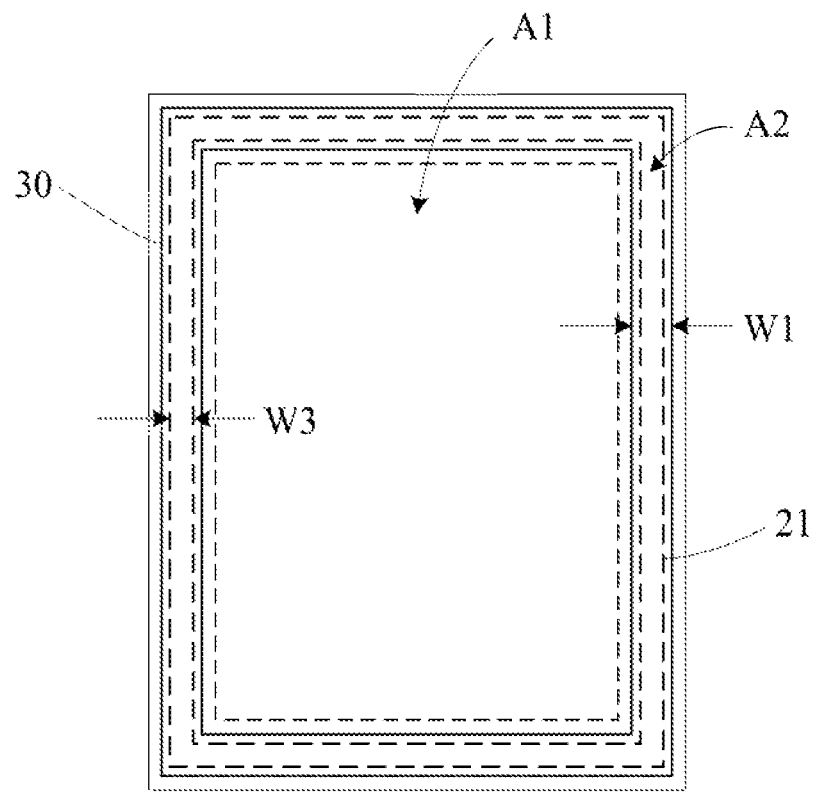
FIG. 5 is a schematic diagram of a second structure of the sealant layer provided by one embodiment of the present application.

Next, please refer to FIG. 5, which is a schematic diagram of a second structure of the sealant layer provided by the embodiment of the present application. In this embodiment, the protective layer 202 includes one of the openings 21, in the direction perpendicular to the light-emitting side of the display panel, a cross-sectional shape of the opening 21 is a zigzag shape. The sealant layer 30 is provided with a conductive adhesive 31 or the sealant layer 30 is formed by the conductive adhesive 31. The conductive adhesive 31 is disposed opposite to the region of the opening 21. Specifically, an innermost dashed frame in FIG. 5 is used to distinguish the display region A1 and the frame region A2. The display region A1 is inside the dashed frame, and the frame region A2 is outside the dashed frame. An outermost solid frame represents a boundary of the display panel. The zigzag shape formed by the two dashed boxes in the frame region A2 represents the region of the opening 21. The zigzag shape formed by the two solid line frames in the frame region A2 represents the sealant layer 30.

It can be understood that, in this embodiment, only one opening 21 is provided, specifically a continuous zigzag shape groove body, and the corresponding conductive adhesive 31 also needs to be coated for a full circle. Therefore, the entire sealant layer 30 will become wider. That is, in this embodiment, the frame region A2 is the conductive region A23, and the insulating region A24 does not exist. Therefore, the ability to transfer charges is higher. However, compared with FIG. 4, in this embodiment, more conductive adhesive 31 need to be applied, and therefore, the cost will also increase accordingly.

It should be noted that, in other embodiments, the sealant layer 30 may be directly formed of the conductive adhesive 31 without coating a full circle of the conductive adhesive 31. That is, the sealant layer 30 is made of the colloidal material containing the conductive particles 302, one coating process can be saved, and the manufacturing efficiency can be improved.

It should be noted that the manufacturing process of the opening 21 in this embodiment can be laser, exposure, or dry etching process, preferably laser. A laser energy is adjusted according to a thickness and a material of the protective layer 202 designed for the actual product.

In the embodiment shown in FIG. 5, in the direction perpendicular to the light-emitting side of the display panel, a width W1 of the sealant layer 30 is greater than a width W3 of the opening 21. It can be understood that, in this embodiment, by setting the width W1 of the sealant layer 30 to be greater than the width W3 of the opening 21, the sealant layer 30 can fill the entire region of the opening 21 and improve a sealing performance of the display panel.

It should be noted that, in the embodiment shown in FIG. 5, the manufacturing process of the sealant layer 30 is as follows: coating a whole circle of conductive adhesive 31 on the sealant, and then when pressing and curing, the width W3 of the opening 21 should be smaller than 1.5 times the width (corresponding to the width W2 of the sealant layer 30 in the insulating region A24 in FIG. 4) of the sealant layer 30 before widening, so that avoid the region where the entire opening 21 cannot be filled after the conductive adhesive 31 and the sealant are pressed together. The sealant layer 30 can fill the entire region of the opening 21 to improve the sealing performance of the display panel when the forming process of the sealant layer 30 is as follows: directly using the colloidal material containing the conductive particles 302 to manufacture the sealant layer 30, and then directly setting the width W1 of the sealant layer 30 to be larger than the width W3 of the opening 21 during curing.

Figure 6:
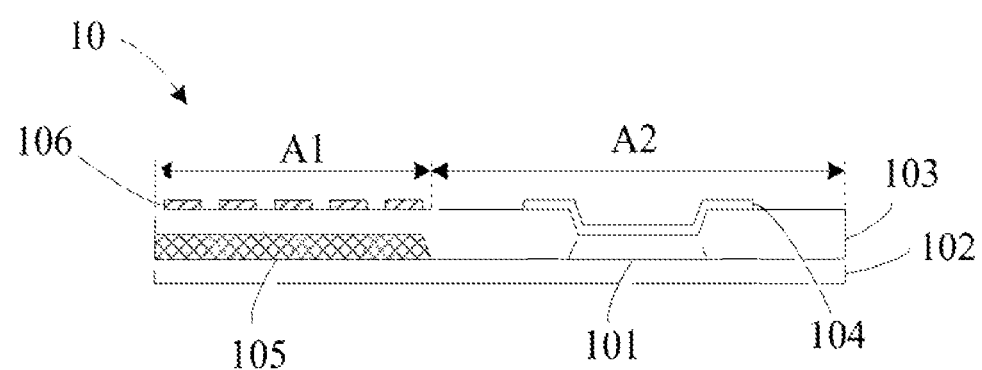
FIG. 6 is a schematic diagram of a first structure of a first substrate provided by one embodiment of the present application.

Next, please refer to FIG. 6, FIG. 6 is a schematic diagram of a first structure of a first substrate provided by one embodiment of the present application. In this embodiment, the first substrate 10 includes a common electrode layer 105, a first insulating layer 103, and a pixel electrode layer 106. The first insulating layer 103 is positioned on at a side of the common electrode layer 105 close to the second substrate 20. The pixel electrode layer 106 and the connection electrode 104 are positioned on a side surface of the first insulating layer 103 close to the second substrate 20.

It can be understood that in this embodiment, the pixel electrode layer 106 and the common electrode layer 105 are arranged in different layers, so a transmittance of the display panel can be improved, but two times of film formation and two times of etching are required, and the cost and complexity are relatively high. The ground electrode 101 can be manufactured and etched together with the common electrode layer 105. The connection electrode 104 can be manufactured and etched together with the pixel electrode layer 106, only the corresponding mask needs to be changed, and no new process is required. Therefore, the production cost can be saved and the production efficiency can be improved.

Figure 7:
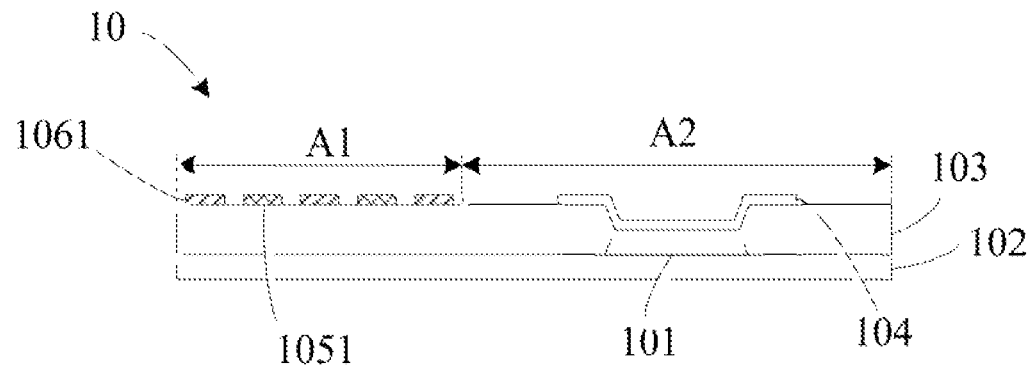
FIG. 7 is a schematic diagram of a second structure of the first substrate provided by one embodiment of the present application.

Next, please refer to FIG. 7, which is a schematic diagram of a second structure of a first substrate provided in one embodiment of the present application. In this embodiment, the first substrate 10 includes a first insulating layer 103, a plurality of common electrodes 1051, and a plurality of pixel electrodes 1061. The common electrode 1051 and the pixel electrode 1061 are insulated disposed. The connection electrode 104, the plurality of common electrodes 1051, and the plurality of pixel electrodes 1061 are positioned on a side surface of the first insulating layer 103 close to the second substrate 20.

It can be understood that in this embodiment, the plurality of pixel electrodes 1061 and the plurality of common electrodes 1051 are arranged in a same layer. Therefore, only one film formation and one etching are required, and the cost and complexity are low. Because it is necessary to ensure that different electrodes cannot be connected together in one film formation, a distance should be set between the pixel electrode 1061 and the common electrode 1051. This distance does not help the transmittance, and also wastes the opening space, causing the transmittance is low. The ground electrode 101 can be manufactured in a same process as any metal layer in the thin film transistor. The connection electrode 104 can be manufactured and etched together with a plurality of pixel electrodes 1061 and a plurality of common electrodes 1051, only a corresponding mask needs to be changed, and no new process needs to be added. Therefore, the manufacturing cost can be saved and the production efficiency can be improved.

Figure 8A:
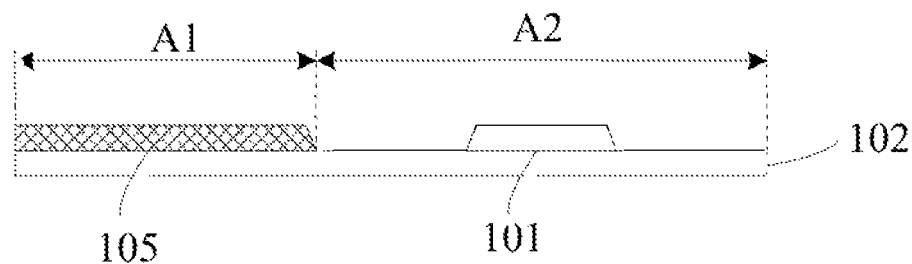
FIGS. 8*a* to 8*d* are schematic diagrams of basic structures of each component in the manufacturing process of the first substrate in FIG. 6.

Next, please refer to FIGS. 8a to 8d, which are schematic diagrams of basic structures of each component in the manufacturing process of the first substrate in FIG. 6. First, as shown in FIG. 8a, the common electrode layer 105 and the ground electrode 101 are manufactured on the first base substrate 102. The ground electrode 101 can be manufactured and etched together with the common electrode layer 105, only the corresponding mask needs to be changed, and no new process needs to be added. Therefore, it can save manufacturing costs and improve manufacturing efficiency.

Figure 8B:
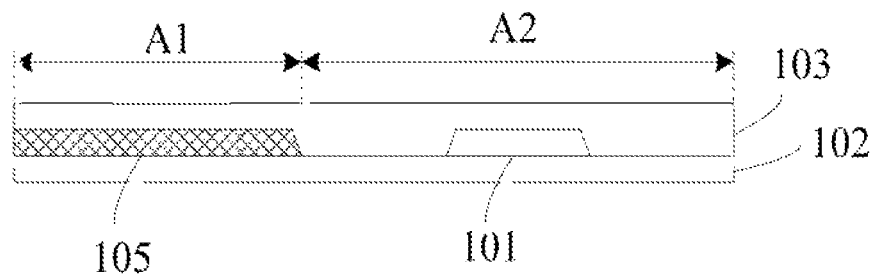

Next, as shown in FIG. 8b, the first insulating layer 103 is manufactured on the common electrode layer 105 and the ground electrode 101.

Figure 8C:
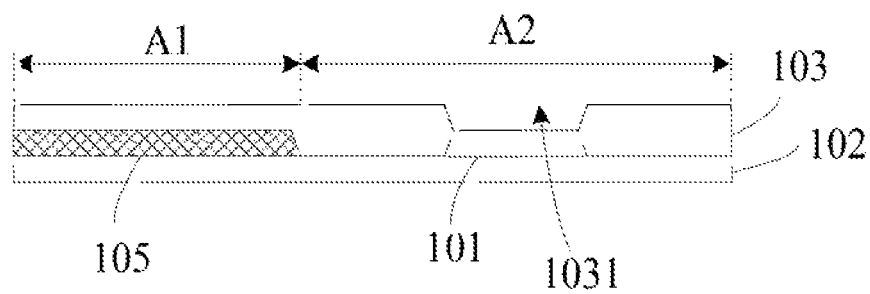

Next, as shown in FIG. 8c, a through hole 1031 is formed on the first insulating layer 103 in a region opposite to the ground electrode 101. Since the driving circuit layer is not shown in the figure, the thin film transistors in the pixel electrode layer 106 and the driving circuit layer are not shown in the figure. The through holes for electrical connection are not shown. It should be noted that the through hole 1031 on the ground electrode 101 are formed together with the through holes that are electrically connected to the pixel electrode layer 106 and the thin film transistor. Therefore, only the corresponding mask needs to be changed, and no additional processes are required, which can also save manufacturing costs and improve productivity.

Figure 8D:
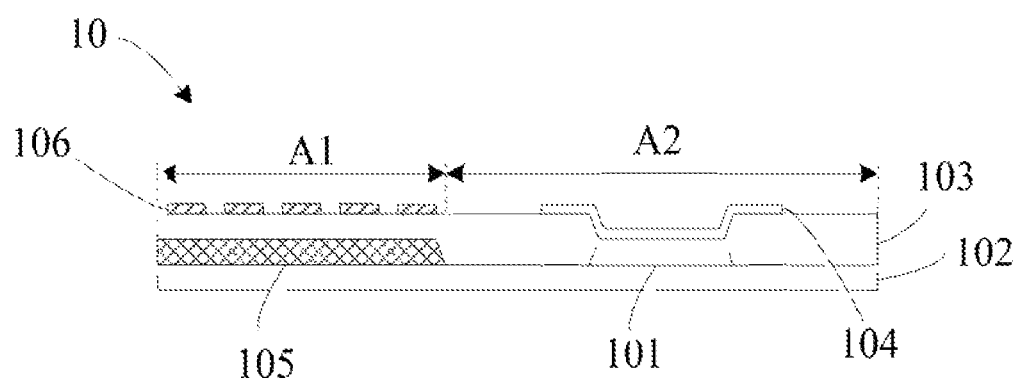

Next, referring to FIG. 8d, the pixel electrode layer 106 and the connection electrode 104 are manufactured on the first insulating layer 103. The connection electrode 104 covers the through hole 1031 on the first insulating layer 103, thereby increasing a stability of the through hole 1031 and a conductivity between the connection electrode 104 and the ground electrode 101. The connection electrode 104 and the pixel electrode layer 106 are manufactured and etched together, only the corresponding mask needs to be changed, and no new process needs to be added. Therefore, the manufacturing costs is saved and the manufacturing efficiency is improved.

It should be noted that there is no limitation on which layer the ground electrode 101 of the present application is specifically arranged on. It is only necessary to form through holes on other film layers on the ground electrode 101 when the last metal layer (ie the connection electrode 104) is formed, and the last metal layer will cover the through holes on the ground electrode 101 when the last metal layer is formed, thus conducting with the ground electrode 101.

It should be noted that, the manufacturing process of the second substrate 20 is to punch holes in the protective layer 202 corresponding to the sealant layer 30 after the traditional process is completed, thereby exposing the black matrix layer 201. The shape of the hole can be a discrete hole in FIG. 3 and FIG. 4, or also can be a continuous zigzag shape groove in FIG. 5. Then, after applying the sealant, the conductive adhesive 31 is applied to the region opposite to the punched holes on the sealant. The first substrate 10 and the second substrate 20 are pressed together and then cured to form the sealant layer 30, to realize an electrical connection between the black matrix layer 201 and the ground electrode 101 through the conductive adhesive 31, to transfer the charges accumulated on the black matrix layer 201, so as to avoid the charge migration to the display region A1 and resulting in light leakage from the display region A1.

One embodiment of the present application further provides a display device including a backlight module and the above-mentioned display panel. The display panel is positioned on a light-emitting side of the backlight module, and a structure and manufacturing process of the display panel are shown in FIGS. 2 to 8d and related descriptions will not be repeated here. The display device provided by the embodiment of the present application may be a product or component with a display function, such as a mobile phone, a tablet computer, a notebook computer, a TV, a digital camera, and a navigator.

A display panel and a display device provided by the embodiments of the present application are described above in detail. It should be understood that the exemplary embodiments described herein should be regarded as descriptive only, and are used to help understand the method and the core idea of the present application, but not to limit the present application.

What is claimed is:

1. A display panel, comprising a display region and a frame region arranged around the display region, wherein the display panel comprises:
   a first substrate comprising a ground electrode positioned in the frame region;
   a second substrate comprising a black matrix layer and a protective layer, wherein the protective layer is positioned on a side surface of the black matrix layer close to the first substrate, and wherein the protective layer comprises a plurality of openings in the frame region; and
   a sealant layer positioned between the first substrate and the second substrate;

wherein the sealant layer is provided with a conductive adhesive or the sealant layer is formed by the conductive adhesive, wherein the conductive adhesive is disposed opposite to a region of the openings and is disposed in the sealant layer, and wherein the black matrix layer is electrically connected to the ground electrode through the conductive adhesive;

wherein the frame region comprises a plurality of conductive regions and a plurality of insulating regions, wherein the plurality of the openings are arranged in a one-to-one correspondence with the plurality of the conductive regions, and wherein the insulating region is positioned between two adjacent conductive regions;

wherein in a direction perpendicular to the light-emitting side of the display panel, a width of the sealant layer in the conductive region is greater than a width of the sealant layer in the insulating region; and wherein in the direction perpendicular to the light-emitting side of the display panel, the width of the sealant layer in the insulating region is 1.5 times greater than a width of the opening, and the width of the sealant layer in the conductive region is larger than the width of the opening.

2. The display panel according to claim 1,
wherein the frame region comprises a first frame region and a second frame region that are adjacently arranged, and wherein on a plane perpendicular to a light-emitting side of the display panel, an area of the first frame region is larger than an area of the second frame region; and wherein a number of the openings in the first frame region is greater than a number of the openings in the second frame region.

3. The display panel according to claim 1, wherein the protective layer comprises one of the openings, wherein in a direction perpendicular to the light-emitting side of the display panel, a cross-sectional shape of the opening is a zigzag shape; and wherein the sealant layer is provided with the conductive adhesive or the sealant layer is formed by the conductive adhesive, and wherein the conductive adhesive is disposed opposite to the region of the opening.

4. The display panel according to claim 3, wherein in the direction perpendicular to the light-emitting side of the display panel, a width of the sealant layer is greater than a width of the opening.

5. The display panel according to claim 1, wherein the first substrate comprises a connection electrode positioned in the frame region, wherein the connection electrode is positioned on a side of the ground electrode close to the second substrate, and wherein the conductive adhesive is electrically connected to the ground electrode through the connection electrode.

6. The display panel according to claim 5, wherein the first substrate comprises a common electrode layer, a first insulating layer, and a pixel electrode layer, wherein the first insulating layer is positioned at a side of the common electrode layer close to the second substrate, and wherein the pixel electrode layer and the connection electrode are positioned on a side surface of the first insulating layer close to the second substrate; or wherein the first substrate comprises the first insulating layer, a plurality of common electrodes, and a plurality of pixel electrodes, wherein the common electrodes are insulated from the pixel electrodes, and wherein the connection electrode, the plurality of common electrodes, and the plurality of pixel electrodes are positioned on the side surface of the first insulating layer close to the second substrate.

7. The display panel according to claim 1, wherein the conductive adhesive comprises a colloid and a plurality of conductive particles doped in the colloid, wherein a ratio of a diameter of the conductive particle to a vertical distance from the first substrate to the second substrate is greater than or equal to 1.1 and less than or equal to 1.4.

8. A display device, comprising a backlight module and a display panel, wherein the display panel is positioned on a light-emitting side of the backlight module, and wherein the display panel comprises:
a first substrate comprising a ground electrode positioned in the frame region;
a second substrate comprising a black matrix layer and a protective layer, wherein the protective layer is positioned on a side surface of the black matrix layer close to the first substrate, and wherein the protective layer comprises a plurality of opening in the frame region; and
a sealant layer positioned between the first substrate and the second substrate;
wherein the sealant layer is provided with a conductive adhesive or the sealant layer is formed by the conductive adhesive, wherein the conductive adhesive is disposed opposite to a region of the openings and is disposed in the sealant layer, and wherein the black matrix layer is electrically connected to the ground electrode through the conductive adhesive;
wherein the frame region comprises a plurality of conductive regions and a plurality of insulating regions, wherein the plurality of the openings are arranged in a one-to-one correspondence with the plurality of the conductive regions, and wherein the insulating region is positioned between two adjacent conductive regions; and
wherein in a direction perpendicular to the light-emitting side of the display panel, a width of the sealant layer in the conductive region is greater than a width of the sealant layer in the insulating region; and
wherein in the direction perpendicular to the light-emitting side of the display panel, the width of the sealant layer in the insulating region is 1.5 times greater than a width of the opening, and the width of the sealant layer in the conductive region is larger than the width of the opening.

9. The display device according to claim 8,
wherein the frame region comprises a first frame region and a second frame region that are adjacently arranged, and wherein on a plane perpendicular to a light-emitting side of the display panel, an area of the first frame region is larger than an area of the second frame region; and
wherein a number of the openings in the first frame region is greater than a number of the openings in the second frame region.

10. The display device according to claim 8, wherein the protective layer comprises one of the openings, wherein in a direction perpendicular to the light-emitting side of the display panel, a cross-sectional shape of the opening is a zigzag shape; and wherein the sealant layer is provided with the conductive adhesive or the sealant layer is formed by the conductive adhesive, and wherein the conductive adhesive is disposed opposite to the region of the opening.

11. The display device according to claim 10, wherein in the direction perpendicular to the light-emitting side of the display panel, a width of the sealant layer is greater than a width of the opening.

12. The display device according to claim 8, wherein the first substrate comprises a connection electrode positioned in the frame region, wherein the connection electrode is positioned on a side of the ground electrode close to the second substrate, and wherein the conductive adhesive is electrically connected to the ground electrode through the connection electrode.

13. The display device according to claim 12, wherein the first substrate comprises a common electrode layer, a first insulating layer, and a pixel electrode layer, wherein the first insulating layer is positioned at a side of the common electrode layer close to the second substrate, and wherein the pixel electrode layer and the connection electrode are positioned on a side surface of the first insulating layer close to the second substrate; or
 wherein the first substrate comprises the first insulating layer, a plurality of common electrodes, and a plurality of pixel electrodes, wherein the common electrodes are insulated from the pixel electrodes, and wherein the connection electrode, the plurality of common electrodes, and the plurality of pixel electrodes are positioned on the side surface of the first insulating layer close to the second substrate.

14. The display device according to claim 8, wherein the conductive adhesive comprises a colloid and a plurality of conductive particles doped in the colloid, wherein a ratio of a diameter of the conductive particle to a vertical distance from the first substrate to the second substrate is greater than or equal to 1.1 and less than or equal to 1.4.

15. A display panel, comprising a display region and a frame region arranged around the display region, wherein the display panel comprises:
 a first substrate comprising a ground electrode positioned in the frame region;
 a second substrate comprising a black matrix layer and a protective layer, wherein the protective layer is positioned on a side surface of the black matrix layer close to the first substrate, and wherein the protective layer comprises a plurality of openings in the frame region; and
 a sealant layer positioned between the first substrate and the second substrate;
 wherein the sealant layer is provided with a conductive adhesive or the sealant layer is formed by the conductive adhesive, wherein the conductive adhesive is disposed opposite to a region of the openings and is disposed in the sealant layer, and wherein the black matrix layer is electrically connected to the ground electrode through the conductive adhesive;
 wherein the protective layer comprises a plurality of the openings, wherein the conductive adhesive is disposed in the sealant layer, wherein the conductive adhesive is disposed opposite to the region of the openings;
 wherein the frame region comprises a first frame region and a second frame region that are adjacently arranged, and wherein on a plane perpendicular to a light-emitting side of the display panel, an area of the first frame region is larger than an area of the second frame region;
 wherein a number of the openings in the first frame region is greater than a number of the openings in the second frame region; and
 wherein the first substrate comprises a connection electrode positioned in the frame region, wherein the connection electrode is positioned on a side of the ground electrode close to the second substrate, and wherein the conductive adhesive is electrically connected to the ground electrode through the connection electrode;
 wherein the frame region comprises a plurality of conductive regions and a plurality of insulating regions, wherein the plurality of the openings are arranged in a one-to-one correspondence with the plurality of the conductive regions, and wherein the insulating region is positioned between two adjacent conductive regions; and
 wherein in a direction perpendicular to the light-emitting side of the display panel, a width of the sealant layer in the conductive region is greater than a width of the sealant layer in the insulating region; and
 wherein in the direction perpendicular to the light-emitting side of the display panel, the width of the sealant layer in the insulating region is 1.5 times greater than a width of the opening, and the width of the sealant layer in the conductive region is larger than the width of the opening.

* * * * *